May 13, 1969     W. R. PRATT     3,443,343

DIAMOND ABRASIVE SAW BLADE

Filed Oct. 11, 1965

United States Patent Office 3,443,343
Patented May 13, 1969

---

3,443,343
DIAMOND ABRASIVE SAW BLADE
Willard R. Pratt, Brighton, N.Y., assignor, by mesne assignments, to Federal-Mogul Corporation, Southfield, Mich., a corporation of Michigan
Filed Oct. 11, 1965, Ser. No. 494,729
Int. Cl. B24d 5/00, 7/00; C04b 31/16
U.S. Cl. 51—206.4         5 Claims

ABSTRACT OF THE DISCLOSURE

There is disclosed a diamond abrasive saw blade having abrasive elements each of which comprises a hard matrix material containing diamond particles which project slightly beyond the face of the hard matrix material. A layer of softer material initially overlies the face of the hard matrix from which the diamond particles project. When the blade is first put into use, the soft layer quickly wears away, exposing the diamonds in position to perform the cutting action. In manufacturing the abrasive elements, powder for forming the soft layer is first put into the mold, and then the powder for forming the hard matrix material, containing the diamond particles mixed with the matrix powder, is placed in the mold over the first mass of powder, so that some of the diamond particles in the matrix powder will project into the powder for the softer layer, after which pressure and heat are used (either successively or simultaneously) to complete the formation of the abrasive element, which is then attached to a steel core or other suitable body for carrying the abrasive elements.

---

This invention relates to a diamond abrasive rotary cutting tool of the kind often called a saw blade.

An object of the invention is the provision of a generally improved and more satisfactory blade of this character, and especially one in which the diamonds are held in a relatively hard matrix but nevertheless will start to cut hard materials satisfactorily very quickly after the new blade is put into use, instead of requiring a long "breaking in" period before satisfactory cutting is achieved.

Another object is the provision of a simple and satisfactory method for making such a blade.

These and other desirable objects may be attained in the manner disclosed as an illustrative embodiment of the invention in the following description and in the accompanying drawings forming a part hereof, in which.

Figure 1:
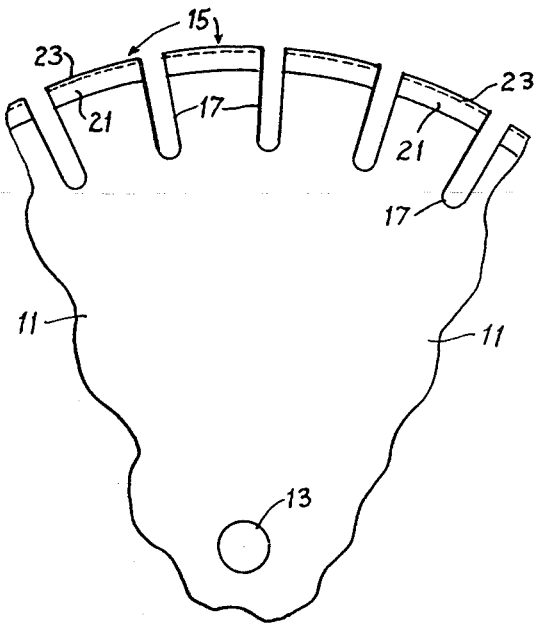
FIG. 1 is a fragmentary face view of a saw blade or cutting disk according to a preferred embodiment of the invention.

Referring first to FIG. 1, the blade of the present invention comprises the usual conventional sheet metal drive disk or core 11, made of suitable wrought metal, preferably steel, and provided with an arbor hole 13 for mounting the disk on a rotary shaft. Secured around the periphery of the core 11 are a plurality of circumferentially spaced arcute cutting elements 15 brazed or soldered to the edge of the core in the conventional way.

The present invention has to do with the construction of the individual abrasive elements 15, and the other features of the construction are immaterial for purposes of this invention, and may be varied at will within the skill of the art. Thus the core 11 may have radial notches 17 between successive abrasive elements, but this is optional.

Figure 3:
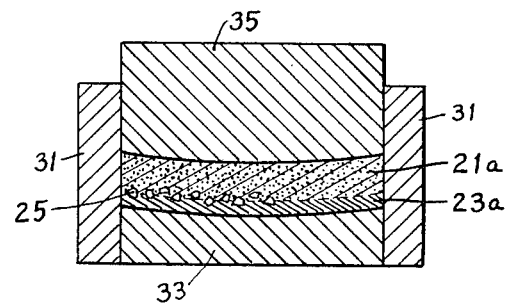
FIG. 3 is a diagrammatic vertical section through a mold used in making one of the cutting elements, illustrating certain aspects of the method of manufacture.

Each of the abrasive elements 15 has a main body portion 21 of hard matrix material containing diamond dust or diamond fragments, and a layer of softer material 23 overlying the portion 21 at the outer or cutting edge of the abrasive element, with the diamond particles at the surface of the portion 21 protruding somewhat into the softer material 23. This feature of having the diamond particles firmly held in a hard matrix, but protruding from the hard matrix into a softer layer, is an important feature of the invention. This feature can be achieved as follows:

A typical mold or die for molding the abrasive elements by either hot pressing or cold pressing techniques is shown schematically in FIG. 3. There is a tubular mold body 31, a bottom insert 33 with its top surface arcuately formed to the desired radius for the upper surface of the finished abrasive element, and a top insert 35 with its lower face formed to the desired radius for the lower surface of the abrasive element. These three parts are preferably made of graphite. The bottom insert 33 being in place and the top insert 35 being removed, a quantity of the softer material 23a for forming the softer layer 23 is spread in the mold, in powder form. Then a quantity of matrix material powder 21a, containing the diamond particles, in placed in the mold on top of the layer 23a. Then the top insert 35 is placed in position, and the desired downward pressure is applied by a suitable press in the conventional manner well known in the art, with or without heat, depending upon whether hot pressing or cold pressing is desired. Conventional hot pressing is preferred.

Figure 2:
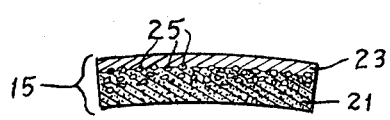
FIG. 2 is an enlarged section taken circumferentially through one of the cutting elements according to the invention.

The downward pressure, applied while layer 23a is still in unconsolidated powder form, will cause the adjacent diamond particles to protrude slightly into the powder 23a, but will hold back the matrix powder 21a to a greater extent than the diamond particles are held back. Thus at the conclusion of the pressing operation, the finished and now completely consolidated and solidified abrasive element will have a structure such as indicated schematically in FIG. 2, where the matrix body is shown at 21, the softer overlying body at 23, and a few of the individual diamond particles are indicated at 25, greatly exaggerated as to size for the sake of illustrating the principle. It is seen that the diamond particles 25 are mainly embedded in and held tenaciously by the hard matrix 21, but nevertheless project or protrude somewhat into the softer material 23.

When the abrasive elements 15 have been made, they are brazed or soldered onto the sheet metal core 11 by conventional techniques, and in a conventional pattern or spacing. In some cases, the concave face of the abrasive element, soldered to the sheet metal core, may be a face of the main matrix material 21. In other cases, to promote soldering, the concave face may have a layer or "underbody" of some other material (e.g., cobalt) as disclosed in my Patents 3,069,816 and 3,203,774. This is a matter of choice so far as the present invention is concerned, as the present invention deals with the construction of the outer cutting portion of each abrasive element, rather than the construction of the inner portion attached to the core. In any event, the abrasive elements are thicker, in the direction of the axis of rotation, than the disk 11, and overhang both faces of the disk in the conventional manner, as illustrated in my patents above mentioned.

A preferred example of the invention is as follows: The martix material 21a is a fine powder composed essentially of 65% tungsten carbide powder, 35% cobalt powder, and a diamond content (dust or fragments) of 36 carats per cubic inch of final compressed volume of the matrix mixture. The overlying softer material 23a (that is, overlying in the final article, FIGS. 1 and 2, but underlying when in the mold, FIG. 3) is essentially 100% cobalt powder. Sufficient quantities are used to give a final thickness in a radial direction, after compression of 1/32 inch of the softer overlayer 23, and 3/16 inch of the matrix 21.

After putting the powder layers in the mold, the abrasive segment is formed by a hot pressing operation, using a pressure of 2½ tons per square inch on the powdered material. While maintaining this pressure, the mold and contents are heated from room temperature to 2100 degrees Fahrenheit during a heating cycle of four minutes, followed by retention at this temperature and pressure for one minute, followed by release of pressure and cooling down to room temperature during fifteen minutes.

Alternatively, the same powders in the same quantities may be formed into the abrasive segment by a cold pressing operation, pressing at room temperature at a pressure of 50 tons per square inch, with no holding period or dwell, the pressure being released as soon as attained. This serves to compact the powder so that it can be readily handled. The compressed segment is then transferred from the press to a heating chamber, wherein the segment is raised from room temperature to 2100 degrees Fahrenheit during a heating interval of fifteen minutes. It is held at this temperature for one-half hour, then cooled to room temperature during a cooling interval of twenty minutes. No pressure is applied in the heating chamber. This operation of heating the cold pressed or compacted segment, without application of pressure during the heating, is sometimes called sintering.

The above mentioned mixture of cobalt and tungsten carbide is the preferred matrix material. It is very hard, and grips the diamond particles tenaciously. However, it is within the broad aspect of the invention to use other relatively hard matrix materials for holding the diamond particles, e.g., the matrix may be made of powdered titanium carbide, powdered Stellite, or powdered aluminum oxide or other non-metallic hard materials, with the dimaond particles, of course. The softer top layer (free or substantially free from diamond particles) is preferably made from cobalt powder as above stated, but may be of any material which is soft and easily worn away as compared to the hard and abrasive-resistant matrix body which contains the diamond particles, e.g., copper, iron, nickel, cupro-nickel alloy, brass, or bronze. The above mentioned temperatures, both for hot pressing and for cold pressing, may be varied up or down from the preferred figures above given, depending on what materials are used in the layers 21 and 23, the temperatures preferably being close to but somewhat below the temperature of fluidity of the ingredient having the lowest melting point. Pressures may also be varied from the figures given for the preferred example; e.g., 250 pounds per square inch to 5 tons per square inch for hot pressing, and 25 to 60 tons per square inch, for cold pressing.

It will be apparent from what has been said above that the softer layer 23 is united to diamond-containing body 21 in a way which may be described as metallurgically united, since the sintering or firing of the article metallurgically bonds the metal of the layer 23 to the metal of the body 21.

The action of a cutting element or segment made according to this invention is quite remarkable. The softer outer layer 23 wears down quickly during initial use, so that the saw blade is very quickly "broken in" to the efficient use condition where the diamond particles protrude slightly from the body which holds them. This results in an abrasive element which gives fast cutting action, since it is mainly the diamond particles which do the cutting rather than the matrix which holds them, and an element which has long life, since the diamond particles are held tenaciously in a very hard matrix from which they are not easily dislodged or broken away.

As contrasted with this, if the softer outer layer is omitted the matrix material is initially flush with the outermost surfaces of the diamond particles, and a very long "break in" period is required before the abrasive element will cut efficiently. The matrix material itself does not perform an efficient cutting operation, and the fact that it comes out flush with the diamond particles prevents the diamond particles from performing efficient cutting. Thus the abrasive element has to be worn down by considerable use, to wear away the matrix so the diamond particles will protrude slightly, before it performs really efficiently. With a softer matrix material, it does not take too long to "break in" the saw blade or other abrasive tool, but the life of the tool is short because the diamond particles have a tendency to break away or pull out of the matrix. When the matrix is made harder in order to hold the diamond particles more firmly and give the tool a longer life, the above mentioned difficulties occur. The present invention overcomes these difficulties and allows a diamond abrasive tool of exceptionally long life to begin its efficient abrading action quite quickly, after the soft outer layer is worn away during a short initial "break in" period. The soft outer layer construction may be used, of course, on any desired working surface of the tool or element; e.g., on the lateral sides of the abrasive segment 15, as well as on the outermost or top surface.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A diamond abrasive element including a body having a main work-cutting surface, the major portion of said body in the vicinity of said work-cutting surface being composed at least mainly of a relatively hard metallic matrix having diamond particles interspersed therein and held tenaciously by said matrix, and a relatively soft metallic overlayer overlying and metallurgically united to said matrix on said work-cutting surface, the diamond particles initially protruding partially from said matrix into said overlayer, said relatively soft overlayer being adapted to be worn away relatively quickly upon initial use so that thereafter said matrix with diamond particles protruding therefrom will constitute the work-cutting surface.

2. A construction as defined in claim 1, further including a sheet metal rotary core having a series of said diamond abrasive elements firmly affixed to the periphery of the core in circumferentially spaced relation to each other.

3. A construction as defined in claim 1, in which the major portion of said matrix is of tungsten carbide.

4. A construction as defined in claim 3, in which the major portion of said overlayer is of cobalt.

5. A construction as defined in claim 1, in which said matrix is composed substantially of 65% tungsten carbide and 35% cobalt, and in which said overlayer is composed substantially of cobalt.

References Cited

UNITED STATES PATENTS

| | | | |
|---|---|---|---|
| 2,081,843 | 5/1937 | Webster | 51—209 X |
| 2,200,281 | 5/1940 | Koebel | 76—108 |
| 2,265,377 | 12/1941 | Kline | 51—204 X |
| 2,353,404 | 7/1944 | Keeleric | 51—295 |
| 2,858,256 | 10/1958 | Fahnoe | 51—409 X |
| 2,904,418 | 9/1959 | Fahnoe | 51—309 X |
| 3,064,399 | 11/1962 | Anderson | 51—206.4 |
| 3,069,816 | 12/1962 | Pratt | 51—206 |
| 3,343,932 | 9/1967 | Juillerat | 51—293 |

ROBERT C. RIORDON, *Primary Examiner.*

D. G. KELLY, *Assistant Examiner.*

U.S. Cl. X.R.

51—309